United States Patent [19]

Christen et al.

[11] 4,098,852

[45] Jul. 4, 1978

[54] PROCESS FOR CARRING OUT A GAS/LIQUID HEAT-EXCHANGE

[75] Inventors: Gilbert Christen, Lyon; Bernard Favre, Ecully; Xavier Marze, Lyon; Michel Salmon, Mions, all of France

[73] Assignee: Rhone-Poulenc, S.A., Paris, France

[21] Appl. No.: 573,798

[22] Filed: May 1, 1975

Related U.S. Application Data

[63] Continuation of Ser. No. 375,180, Jun. 29, 1973, abandoned.

[30] Foreign Application Priority Data

Jul. 4, 1972 [FR] France ................ 72 24153

[51] Int. Cl.² ................................ B01F 3/04
[52] U.S. Cl. ........................ 261/104; 165/60; 165/173; 261/154
[58] Field of Search .......... 210/321 R, 321 D, 321 K, 210/23; 261/95, 104, 107, 154, DIG. 11; 264/209, 241; 165/60, 173, 181, 183, DIG. 10

[56] References Cited

U.S. PATENT DOCUMENTS

| 2,725,729 | 12/1955 | Mills .................. 261/154 X |
| 2,990,696 | 7/1961 | Fisher ................. 261/104 X |
| 3,228,876 | 1/1966 | Mahon ................ 210/321 X |
| 3,228,877 | 1/1966 | Mahon ................ 210/321 X |
| 3,403,531 | 10/1968 | Oesterheld ......... 261/DIG. 11 |
| 3,441,142 | 4/1969 | Oja ..................... 210/321 |
| 3,554,379 | 1/1971 | Pye ..................... 210/321 |
| 3,558,481 | 1/1971 | Furgerson .......... 210/321 X |
| 3,648,754 | 3/1972 | Sephton .............. 210/321 X |
| 3,702,658 | 11/1972 | McNamara et al. .. 210/321 |
| 3,730,959 | 5/1973 | Horres, Jr. et al. . 210/321 X |

FOREIGN PATENT DOCUMENTS

| 1,445,549 | 6/1966 | France ................. 210/321 |
| 1,455,991 | 9/1966 | France ................. 210/321 |
| 1,465,852 | 12/1966 | France ................. 210/321 |

OTHER PUBLICATIONS

Cooper, W. W. and DeFilippi, R. P. *Ultrafiltration Membranes for Blood Serum Protein Concentration*, Paper No. 10c, at AIChe Meeting (Apr. 1, 1968) pp. 1,5 and FIG. 4.

*Primary Examiner*—Richard L. Chiesa
*Attorney, Agent, or Firm*—Stevens, Davis, Miller & Mosher

[57] ABSTRACT

A gas/liquid heat exchanger is provided which comprises means for circulating gas and/or liquid and a plurality of hollow fibres, adapted to receive said gas or said liquid, said fibres being of polymeric material which is inert with respect to said liquid and are permeable to said liquid. Such a heat exchanger considerably improves the efficiency/volume ratio of the appratus, largely as a result of the liquid which permeates through the fibres vaporizing.

18 Claims, 1 Drawing Figure

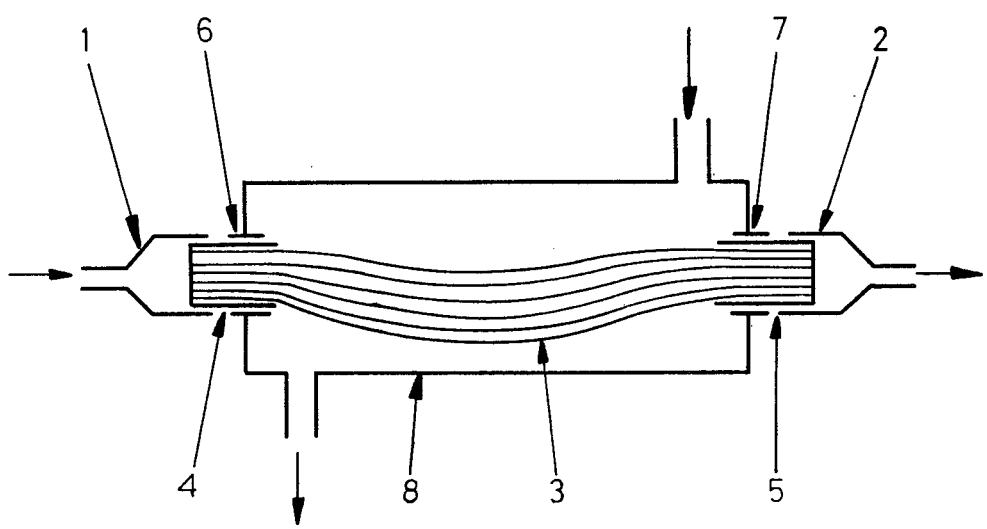

PROCESS FOR CARRING OUT A GAS/LIQUID HEAT-EXCHANGE

This is a continuation of application Ser. No. 375,180 filed June 29, 1973, now abandoned.

The present invention relates to heat exchangers.

Heat exchangers using hollow fibres have been described in French Pat. No. 1,445,549; the hollow fibers used in this patent are fibres of a leak-proof polymeric material, that is to say a polymeric material which is impermeable to the fluids used.

A new heat exchanger with improved performance, that is to say one which permits greater heat exchange for a given size of apparatus, has now been found, and it is this which forms the subject of the present invention.

According to the present invention, there is provided a heat exchanger between a gas and a liquid, preferably water, which comprises means for establishing a flow of the gas and, optionally, of the liquid, and a plurality of hollow fibres adapted to receive said gas or said liquid, said fibres being of polymeric material which is inert with respect to said liquid, and are permeable to said liquid.

By "hollow fibres", as used herein, are meant fibres which possess a continuous channel in the body of the fibres which is free from polymeric material.

The hollow fibres which can be used usually have an external diameter less than 1 mm, and preferably less than 600 $\mu$, the thickness of the wall of these fibres is generally between 20 and 70% of a quarter of the sum of the external and internal diameters.

The hollow fibres which can be used in the heat exchangers of the present invention are mainly of two types, ultra-filtering and osmotic.

The ultra-filtering hollow fibres usually have a permeability towards the liquid used in the exchanger, inside the hollow fibres, under a relative pressure of 2 bars, greater than 5 l/day.m², preferably greater than 30 l/day.m².

The osmotic hollow fibres usually have substantially zero permeability towards the liquid used in the heat exchanger, inside the hollow fibres under a relative pressure of 2 bars, and, under a relative pressure of 30 bars inside the hollow fibres, a permeability greater than 5 l/day.m², and preferably greater than 30 l/day.m².

The interior structure of the ultra-filtering or osmotic hollow fibres can be of any known type, especially the homogeneous (or compact) type, the type "with a skin" (or asymmetric type) or the microporous type (possessing uniform or variable microporosity).

The walls of the ultra-filtering fibres should not possess any perforations. This can be checked by verifying that their degree of rejection towards proteins of molecular weight higher than 1,000,000 is greater than 99% (measurement made with an aqueous solution under 2 bars).

The limit of the permeability of a hollow fibre, for a given liquid, is expressed by its drip point, which is the differential pressure between the inside and the outside of the fibre beyond which permeation of the said liquid through the said fibre takes place; in other words, the drip point corresponds to the pressure drop of the liquid permeating through the fibre or to the resistance of the fibre to hydraulic flow through its walls. Osmotic fibres practically always have a drip point. With ultra-filtering fibres, the drip point can, however, in certain cases be zero.

The ultra-filtering and osmotic hollow fibres, which can be used, are known; they are generally prepared by means of spinnerets with an annular orifice or with sectors, by a wet method by internal and/or external coagulation, by a dry method evaporation of the solvent, or by using a melt, for example, cooling a fused polymer; the operating conditions, such as, temperature, concentrations and nature of the solvent and nonsolvent, of the spinning process can be chosen experimentally so as to obtain the desired permeability.

Osmotic hollow fibres are preferably used when the liquid taking part in the heat exchange according to the invention contains liquid which cannot be evaporated; such fibres consist especially of sulphonated polyaryl ether sulphones.

Ultra-filtering hollow fibres are preferably without a drip point and are usually made of hydrophilic polymeric material, especially of regenerated cellulose, cellulose esters and/or ethers, polyvinyl alcohol, copolymers of vinyl alcohol and vinyl esters, polysaccharides, casein, and copolymers of acrylonitrile and ionic monomers such as monomers with sulphonic acid groups. The latter copolymers have, in addition, the advantage of making it easier to remove scale when necessary due to the fact that such fibres can withstand being washed with acid solutions.

The technology of the heat exchangers according to the present invention is in accordance with that of apparatuses with hollow fibres known for dialysis and ultrafiltration, or with that of the apparatuses described in French Pat. Nos. 1,445,549, 1,455,991 and 1,465,852.

The present invention will now be illustrated merely by way of example, with reference to the FIGURE of the accompanying drawing which shows schematically a heat exchanger of the present invention.

Lateral ends 4 and 5 of hollow fibres 3 are embedded in a cured synthetic resin and are connected at these points, firstly, by joints 6 and 7 to a jacket 8 of the heat-exchanger and, secondly, to terminal sleeves 1 and 2 which enable liquid, typically, water, respectively, to enter and leave the fibres.

The present invention also provides a process for carrying out a heat exchange between a gas and a liquid which comprises:

(a) causing a gas to flow inside or outside, preferably outside, the hollow fibres of a heat exchanger of this invention, (b) supplying the other side of the wall of the fibres relative to the gas, with a liquid, it being possible for this liquid optionally to pass from the exchanger to an outlet, (c) applying a differential pressure across the walls of the hollow fibres such that the absolute pressure of the liquid is greater than the absolute pressure of the gas, said differential pressure being greater than the drip point of the hollow fibre, and (d) adjusting the rate of flow of gas in the heat exchanger so that the permeate (the liquid which has passed through the wall of the fibres) is at least partially vaporised as it migrates.

The nature of the liquid used in the exchanger according to the invention depends, of course, on the particular application for which the heat exchanger is being used; however, in the majority of applications, aqueous solutions and even, quite simply, water can be used.

The nature of the gas used in the heat exchangers according to the invention also depends on the particular application considered; it should be understood, however, that the term "gas" is not intended to limit the physical nature of the fluid considered and that it includes vapours; air may be mentioned as a gas which is frequently used. In the exchanger, this air is charged with variable amounts of vapour of the liquid resulting from evaporation at the surface of the fibres.

The vaporisation of the permeate by the gas can be complete or partial; advantageously 20 to 100%, and preferably 100%, of this permeate is vaporised; when this vaporisation is not complete, the liquid which flows out of the exchanger can advantageously be trapped.

The differential pressure across the walls of the hollow fibres is usually less than 20 bars and, preferably, between 0.1 and 5 bars, in the case of ultra-filtering hollow fibres. In the case of osmotic hollow fibres, the differential pressure is usually between 5 and 80 bars, and, more particularly, between 10 and 40 bars.

The heat exchangers of this invention can transfer heat equally well from the gas to the liquid and from the liquid to the gas, depending on the particular working conditions chosen.

As previously mentioned, in the heat exchange process of this invention, the liquid taking part in the exchange may or may not pass through the exchanger to an outlet; if it does not pass through the exchanger to an outlet, the liquid which is introduced into the heat exchanger passes entirely (by permeation) through the walls of the hollow fibres; when the liquid flows through the exchanger to an outlet, only a part of this liquid passes through the walls of the hollow fibres; of course, when all the liquid passes through the walls of the hollow fibres, the heat exchanger operates only as a gas cooling device.

Specific applications of the process of the present invention include evaporation-type refrigerators, for example for water and especially for effluents, air conditioners, more particularly conditioners of air for a sterile atmosphere and air humidifiers; in effect, since germs, bacteria or viruses, in general, cannot migrate through the hollow fibres, the liquid which permeates is substantially bacteriologically pure; which makes it possible to condition air without contaminating it.

The heat exchangers of the present invention make it possible considerably to improve the efficiency/volume ratio of the apparatus; this improvement is due principally to the heat of vaporisation of the liquid permeate. Furthermore, they have the advantage of having an exchange capacity which can be controlled easily by changing the flow rates and pressure of the liquid and/or of the gas. They are especially valuable for cooling liquids and/or gases.

The following Examples further illustrate the present invention. In these Examples, by "relative pressure" is meant the difference between absolute pressure and atmospheric pressure; unless otherwise stated, the gas volumes are measured under standard conditions of temperature and pressure.

EXAMPLE 1

Nature of the fibres

The fibres consist of a copolymer of acrylonitrile and sodium methallylsulphonate (91% by weight of acrylonitrile)

external diameter: 570$\mu$ internal diameter: 360 $\mu$ permeability to water under 2 bars: 300 l/day.m$^2$ drip point: 0.02 bar degree of rejection greater than 99% to bovalbumin of molecular weight 70,000 (measurement made on a 5 g/l solution).

Heat exchanger

An apparatus with a bundle of fibres such as that shown schematically in the FIGURE is used.

The exchanger comprises 362 fibres having a total useful length of 235 m; the internal diameter of the jacket 8 is 27 mm.

The spacing between the fibres was achieved by mounting the bundle in such a way that the fibres are not stretched but bend under their own weight; the distance between the two sealing positions is 65 cm when the fibres are stretched and 63 cm in the assembled exchanger.

Operating conditions

The exchanger functions as an air cooler. Water is caused to flow through the fibres at a flow rate of 15.6 l/hour under a relative inlet pressure of 0.59 bar, an inlet temperature of 15.2° C and an outlet temperature of 17° C; the flow rate of ultra-filtrate is 0.123 l/hour, of which 0.042 l/hour is evaporated by the air.

The air flows around the fibres at the rate of 3.94 m$^3$/hour, with a relative inlet pressure of 0.02 bar, an inlet temperature of 51° C and an outlet temperature of 15.2° C.

The overall heat exchange coefficient (U) of the apparatus is equal to 11.5 kcal/hour.m$^2$.° C; the fraction of this coefficient resulting from the evaporation of the ultra-filtrate is 40.8%.

EXAMPLE 2

Water is cooled with the heat exchanger used in Example 1.

Operating conditions

Water is caused to flow through the fibres with a flow rate of 16.2 l/hour, a relative inlet pressure of 0.59 bar, an inlet temperature of 46.4° C and an outlet temperature of 37.6° C; the flow rate of ultra-filtrate is 0.177 l/hour and all of it is evaporated.

The air flows around the fibres at the rate of 3.754 m$^3$/hour with a relative inlet pressure 0.02 bar, an inlet temperature of 23.4° C and an outlet temperature of 38° C.

The coefficient (U) is equal to 72.5 kcal/hour.m$^2$.° C; the fraction of this coefficient resulting from the evaporation of the ultra-filtrate is 55.7%.

We claim:

1. A gas-liquid heat exchange process which comprises
   (a) causing a gas to flow on one side of the walls of the hollow fibres of a heat exchanger which comprises a gas and/or liquid circulator and a plurality of spun flexible hollow fibres having an external diameter of less than 1 mm, adapted to receive said gas or said liquid, said fibres being of an organic polymeric material which is inert with respect to said liquid and are permeable to said liquid;
   (b) causing a liquid to flow on the other side of the walls of the fibres relative to the gas;
   (c) applying a differential pressure across the walls of the hollow fibres such that the absolute pressure of the liquid is substantially greater than the absolute pressure of the gas, said differential pressure being greater than the drip point of the hollow fibres; and (d) adjusting the rate of flow of gas in the heat exchanger relative to the rate of flow of liquid therein such that the liquid which passes through the walls of the fibres is at least partially vaporised in the gas.

2. A process according to claim 1, in which the hollow fibres are permeable to water.

3. A process according to claim 1, in which the hollow fibres have an external diameter less than 600μ.

4. A process according to claim 1, in which the walls of the fibres are between 20 and 70% of a quarter of the sum of the external and internal diameters thick.

5. A process according to claim 1, in which the hollow fibres are ultra-filtering hollow fibres which, under a relative pressure of 2 bars inside the fibres, have a liquid permeability greater than 5 l/day.m².

6. A process according to claim 5, in which the hollow fibres are ultra-filtering fibres having a degree of rejection greater than 99% towards proteins of molecular weight higher than 1,000,000.

7. A process according to claim 5, in which the hollow fibres have a permeability greater than 30 l/day.m².

8. A process according to claim 1, in which the hollow fibres are osmotic hollow fibres which, under a relative pressure of 2 bars inside the hollow fibres, have substantially zero liquid permeability and, under a relative pressure of 30 bars inside the hollow fibres, have a permeability towards said liquid greater than 5 l/day.m².

9. A process according to claim 8, in which the hollow fibres have a permeability greater than 30 l/day.m².

10. A process according to claim 1, in which the hollow fibres are made of hydrophilic polymeric material which is selected from regenerated cellulose, a cellulose ester, a cellulose ether, polyvinyl alcohol, a copolymer of vinyl alcohol and a vinyl ester, a polysaccharide, casein, or a copolymer of acrylonitrile and an ionic monomer.

11. A process according to claim 10, in which the hollow fibres are made of a copolymer of acrylonitrile and a monomer containing sulphonic acid groups.

12. Process according to claim 1, in which the gas is caused to flow through the hollow fibres.

13. Process according to claim 1, in which the liquid is an aqueous liquid.

14. Process according to claim 1, in which the gas is air.

15. Process according to claim 1, in which from 20 to 100% of the liquid which passes through the walls of the fibres is vaporised.

16. Process according to claim 1, in which all the liquid introduced into the heat exchanger passes through the walls of the hollow fibres.

17. Process according to claim 1, in which the liquid in the heat exchange flows to an outlet, only a part of this liquid passing through the walls of the hollow fibres.

18. Process according to claim 1 for cooling water or conditioning air.

* * * * *